United States Patent [19]
Fischer

[11] 3,912,489
[45] Oct. 14, 1975

[54] HERBICIDE
[75] Inventor: Adolf Fischer, Mutterstadt, Germany
[73] Assignee: Badische Anilin- & Soda-Fabrik Aktiengesellschaft, Ludwigshafen (Rhine), Germany
[22] Filed: June 1, 1972
[21] Appl. No.: 258,711

[30] Foreign Application Priority Data
June 24, 1971 Germany.......................... 2131401

[52] U.S. Cl. ............................ 71/91; 71/90; 71/99; 71/106; 71/120
[51] Int. Cl.²............................................ A01N 9/22
[58] Field of Search................................ 71/91, 120

[56] References Cited
UNITED STATES PATENTS
| | | | |
|---|---|---|---|
| 3,149,955 | 9/1964 | Fischer et al. ........................ | 71/120 |
| 3,708,277 | 1/1973 | Zeidler et al. .......................... | 71/91 |

Primary Examiner—Elbert L. Roberts
Assistant Examiner—Catherine L. Mills
Attorney, Agent, or Firm—Johnston, Keil, Thompson & Shurtleff

[57] ABSTRACT
Herbicidal composition of a benzothiadiazinone dioxide derivative and a urea derivative.

1 Claim, No Drawings

HERBICIDE

The present invention relates to a herbicide comprising a composition of a benzothiadiazinone dioxide derivative and a urea derivative.

It is known to use benzothiadiazinones and substituted urea derivatives for controlling broadleaved and grassy weeds. However, an action of sufficiently broad spectrum is not always achieved.

We have now found that a composition of a benzothiadiazinone-(4)-2,2-dioxide of the formula

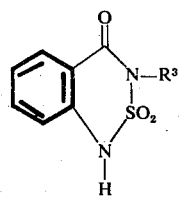

where $R^3$ denotes lower alkyl (isopropyl) or its salts, and a compound of the formula

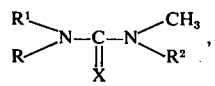

where R denotes 3,4-dichlorophenyl, 4-chlorophenyl, 4-fluorophenyl, 3-chloro-4-methylphenyl, 3-chloro-4-bromophenyl, 4-bromophenyl, 3-chloro-4-methoxyphenyl, 3-tert-butylcarbamoyloxyphenyl, 3-(N-vinyl-N-tert-butyl)-carbamoyloxyphenyl, 3-isopropylcarbamoyloxyphenyl, 3-trifluoromethylphenyl, phenyl or N-2-benzothiazolyl, $R^1$ denotes hydrogen, cyclohexenyl, cyclooctenyl,

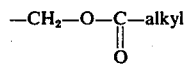

or methyl, $R^2$ denotes hydrogen, methyl, methoxyl, butyn-(1)-yl-3 or chloroformyl and X denotes oxygen or sulfur, has a good herbicidal action. Compositions having a ratio by weight of from 3 : 1 to 1 : 3, especially 1 : 1, are preferred.

The new compounds may be used as herbicides in the form of solutions, emulsions, suspensions or dusts. The form of application depends entirely on the purpose for which the agents are to be used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions, the ingredients as such or dissolved in a solvent may be homogenized in water or organic solvents by means of wetting or dispersing agents. Concentrates which are suitable for dilution with water may be prepared from active ingredient, emulsifying or dispersing agent and possibly solvent.

The agents may be used as dispersion with dispersants, as emulsions with emulsifying agents or as oil dispersions with oils of various types. The oils may however also be added to the dispersions or emulsions direct.

Dusts may be prepared by mixing or grinding the active ingredients with a solid carrier. Compositions of the invention have a good action for instance on *Alopecurus myosuroides*, *Apera spica venti*, *Poa spp.*, *Echinochloa crus-galli*, *Setaria spp.*, *Galium aparine*, *Matricaria spp.*, *Sinapis arvensis*, *Stellaria media*, *Chrysanthemum segetum*, and *Xanthium spp.* and may be used in many crop plants, e. g., cereals, Indian corn, sorgum, peanuts and soya beans.

Application rates are 1 to 4 kg of active ingredient composition per hectare.

The use of the agents according to the invention is illustrated by the following examples.

The compositions of the invention are intended for postemergence use.

EXAMPLE 1

In the open, the plants *Triticum aestivum*, *Hordeum vulgare*, *Secale cereale*, *Matricaria chamomilla*, *Galium aparine*, *Apera spica venti* and *Alopecurus myosuroides* were treated at a growth height of 3 to 18 cm with the following composition and its individual components as oil dispersions with paraffin oil, dispersed in 500 liters of water.

I   3-isopropyl-2,1,3-benzothiadiazinone-(4)-2,2-dioxide, 1.5 and 2.25 kg per hectare;

II  N-p-chlorophenyl-N'-methyl-N'-isobutynylurea, 0.75 and 2.25 kg per hectare;

I + II 1.5 + 0.75 kg per hectare.

After approximately 14 days it was observed that the composition had the same good crop plant compatibility as the individual active ingredients, combined with a superior herbicidal action on the broadleaved and grassy weeds.

The results of the experiment are given in the following table:

| kg/ha | I 1.5 | | II 0.75 | | I + II 1.5 + 0.75 |
|---|---|---|---|---|---|
| | | 2.25 | | 2.25 | |
| Triticum aestivum | 0 | 0 | 0 | 15 | 0 |
| Hordeum vulgare | 0 | 0 | 0 | 20 | 0 |
| Secale cereale | 0 | 0 | 0 | 20 | 0 |
| Matricaria chamomilla | 60 | 95 | 20 | 60 | 100 |
| Galium aparine | 55 | 95 | 10 | 50 | 100 |
| Apera spica venti | 25 | 40 | 50 | 95 | 100 |
| Alopecurus myosuroides | 15 | 20 | 40 | 90 | 90 |

0 = no damage
100 = complete destruction

EXAMPLE 2

In the open, the plants *Triticum aestivum, Hordeum vulgare, Secale cereale, Matricaria chamomilla, Galium aparine, Apera spica venti* and *Alopecurus myosuroides* were sprayed at a growth height of 2 to 17 cm with the following individual active ingredients and composition thereof, each being dispersed in 500 liters of water per hectare.

I     3-isopropyl-2,1,4-benzothiadiazinone-(4)-2,2-dioxide, 1 and 2 kg/ha;

II N-p-chlorophenyl-N'-methyl-N'-isobutynylurea, 1 and 2 kg/ha;
and

I + II 1 + 1 kg/ha.

After 10 days it was ascertained that the onset of action of the composition was more rapid than that of the individual components, and that it had a superior overall action. The results of the experiment are given below:

| kg/ha | I 1.0 | 2.0 | II 1.0 | 2.0 | I + II 1.0 + 1.0 |
|---|---|---|---|---|---|
| Triticum aestivum | 0 | 0 | 0 | 15 | 0 |
| Hordeum vulgare | 0 | 0 | 0 | 15 | 0 |
| Secale cereale | 0 | 0 | 0 | 20 | 0 |
| Matricaria chamomilla | 45 | 80 | 25 | 55 | 100 |
| Galium aparine | 40 | 80 | 15 | 45 | 90 |
| Apera spica venti | 20 | 35 | 55 | 100 | 100 |
| Alopecurus myosuroides | 10 | 20 | 50 | 80 | 90 |

0 = no damage
100 = complete destruction.

EXAMPLE 3

In a greenhouse, the plants *Triticum aestivum, Hordeum vulgare, Secale cereale, Chrysanthemum segetum, Galium aparine, Apera spica venti,* and *Alopecurus myosuroides* were treated at a growth height of 3 to 19 cm with the following amounts of the following active ingredients and composition thereof, each being dispersed in 500 liters of water per hectare:

I     3-isopropyl-2,1,3-benzothiadiazinone-(4)-2,2-dioxide, 1.5 and 3 kg/ha

II     N-(2-benzothiazolyl)-N-methyl-N'-methylurea, 1.5 and 3 kg/ha;
and

I + II 1.5 + 1.5 kg per hectare.

After 10 to 14 days it was observed that the composition had a stronger action than II on Galium aparine and Chrysanthemum segetum and a stronger action than I on Apera spica venti and Alopecurus myosuroides, combined with good crop plant compatibility. The results of the experiment are given below:

| kg/ha | I 1.5 | 3.0 | II 1.5 | 3.0 | I + II 1.5 + 1.5 |
|---|---|---|---|---|---|
| Triticum aestivum | 0 | 0 | 0 | 20 | 0 |
| Hordeum vulgare | 0 | 0 | 5 | 20 | 5 |
| Secale cereale | 0 | 0 | 10 | 25 | 10 |
| Chrysanthemum segetum | 45 | 85 | 25 | 55 | 100 |
| Galium aparine | 55 | 100 | 25 | 50 | 100 |
| Apera spica venti | 25 | 40 | 65 | 100 | 100 |
| Alopecurus myosuroides | 15 | 30 | 60 | 100 | 95 |

0 = no damage
100 = complete destruction

The action of the following compositions corresponds to that of the above composition:

3-isopropyl-2,1,3-benzothiadiazinone-(4)-2,2-dioxide
+
N-3-chloro-4-bromophenyl-N'-methyl-N'-methoxyurea;
N-4-chlorophenyl-N'-methyl-N'-methoxyurea;
N-3-chloro-4-methoxyphenyl-N,N-'-dimethylurea;
N-3-trifluoromethylphenyl-N,N'-dimethylurea;
N-3-tert-butylcarbamoyloxyphenyl-N'-methylurea;
N-3-chloro-4-methylphenyl-N',N'-dimethylurea;
N-4-bromophenyl-N'-methyl-N'-butyn-1-yl-3-urea;
N-phenyl-N'-methoxyurea;
N-3-chloro-4-methoxyphenyl-N'-methyl-N'-methoxyurea;
N-3-(N-vinyl-N-tert-butyl)-carbamoyloxyphenyl-N',N'-dimethylurea;
N-3-trifluoromethylphenyl-N-acetyloxymethyl-N'N'-dimethylurea;
N-4-fluorophenyl-4-cyclohexenyl-N'-methylurea;
N-3-4-dichlorophenyl-N-cyclohexenyl-N',N'-dimethylurea;
N-3-trifluoromethylphenyl-N-cyclooctenyl-N'N'-dimethylurea;
N-3-tert-butylcarbamoyloxyphenyl-N'-methyl-N'-chloroformylurea;
N-3-chloro-4-methylphenyl-N'-methyl-N'-chloroformylurea.

EXAMPLE 4

In the open, the plants *Triticum aestivum, Hordeum vulgare, Galium aparine, Vicia spp., Apera spica venti* and *Alopecurus myosuroides* were treated at a growth height of 3 to 20 cm with the following amounts of the following individual active ingredients and compositions thereof, each being dispersed in 500 liters of water per hectare:

I     3-isopropyl-2,1,3-benzothiadiazinone-(4)-2,2-dioxide, 1, 2 and 3 kg per hectare;

II     N-cyclohexenyl-N-3-chloro-4-methylphenyl-N',N'-dimethylurea, 1 and 3 kg per hectare;

III     N-3-chloro-4-methoxyphenyl-N'-methyl-N'-methoxyurea, 2 and 3 kg per hectare;

IV N-3-chloro-4-methylphenyl-N',N'-dimethylurea, 1 and 2 kg per hectare;

V N-(2-benzothiazolyl)-N-methyl-N'-methylurea, 2 and 3 kg per hectare;

I + II 2 + 1 kg per hectare;

I + III 1 + 2 kg per hectare;
I + IV 1 + 1 kg per hectare;
I + V 1 + 2 kg per hectare.

After 2 to 3 weeks it was ascertained that the compositions, compared with the individual active ingredients, had a superior herbicidal action combined with a more favorable crop plant compatibility.

The results of the experiment are given in the following table:

| kg/ha | I 1 | 2 | 3 | III 1 | 3 | 2 | 3 | IV 1 | 2 |
|---|---|---|---|---|---|---|---|---|---|
| Triticum aestivum | 0 | 0 | 0 | 0 | 25 | 0 | 10 | 0 | 20 |
| Hordeum vulgare | 0 | 0 | 0 | 5 | 30 | 0 | 10 | 5 | 20 |
| Galium aparine | 40 | 75 | 95 | 10 | 25 | 25 | 35 | 20 | 35 |
| Vicia spp. | 10 | 25 | 35 | 25 | 60 | 30 | 50 | 20 | 35 |
| Apera spica venti | 20 | 30 | 35 | 60 | 95 | 65 | 90 | 65 | 95 |
| Alopecurus myosuroides | 10 | 20 | 30 | 55 | 90 | 60 | 85 | 60 | 95 |

| kg/ha | V 2 | 3 | I+II 2+1 | I+III 1+2 | I+IV 1+1 | I+V 1+2 |
|---|---|---|---|---|---|---|
| Triticum aestivum | 0 | 25 | 0 | 0 | 0 | 0 |
| Hordeum vulgare | 5 | 20 | 5 | 0 | 5 | 5 |
| Galium aparine | 30 | 45 | 100 | 95 | 90 | 100 |
| Vicia spp. | 40 | 55 | 80 | 75 | 65 | 80 |
| Apera spica venti | 70 | 100 | 100 | 95 | 100 | 100 |
| Alopecurus myosuroides | 70 | 95 | 95 | 90 | 95 | 100 |

0 = no damage
100 = complete destruction.

The action of the following compositions corresponds to that of those above:
dimethylamine salt of 3-isopropyl-2,1,3-benzothiadiazinome-(4)-2,2-dioxide, or
sodium salt of 3-sec-butyl-2,1,3-benzothiadiazinone-(4)-2,2-dioxide
+
N-(4-chlorophenyl)-N'-methyl-N'-butyn-1-yl-3-urea;
N-phenyl-N'-methoxy-N'-methylurea;
N-(4-chlorophenyl)-N'-methoxy-N-'-methylurea;
N-(3,4-dichlorophenyl)-N'-methoxy-N'-methylurea;
N-(3-trifluoromethylphenyl)-N',N'-dimethylurea;
N-(3-chloro-4-bromophenyl)-N'-methoxy-N'-methylurea;
N-(3-chloro-4-methoxyphenyl)-N',N'-dimethylurea;
N-(3-chloro-4-methoxyphenyl)-N-cyclohex-1-enyl-N',N'-dimethylurea;
N-(3-chloro-4-methoxyphenyl)-N-cyclohex-1-enyl-N'-methylurea;
N-dimethyl-N'-acetyloxymethyl-N'-(m-trifluoromethylphenyl)-urea;
N-(3-trifluoromethylphenyl)-N-cyclooctenyl-N',N'-dimethylurea;
N-(3,4-dichlorophenyl)-N-cyclohex-1-enyl-N',N'-dimethylurea.

III N-(3-chloro-4-methylphenyl)-N',N'-dimethylurea, 1.5 and 3 kg/ha;
IV N-(2-benzothiazolyl)-N-methyl-N'-methylurea, 2.5 and 4 kg/ha;
V N-(3-chloro-4-methoxyphenyl)-N',N'-dimethylurea, 3 and 4 kg/ha;
I + II 2.0 + 1.0 kg/ha;
I + III 1.5 + 1.5 kg/ha;
I + IV 1.5 + 2.5 kg/ha;
I + V 1.0 + 3.0 kg/ha.

The results given in the following table were obtained after 3 to 4 weeks.

| kg/ha | I 1 | 1.5 | 2 | 3 | 4 | II 1 | III 3 | 1.5 |
|---|---|---|---|---|---|---|---|---|
| Triticum aestivum | 0 | 0 | 0 | 0 | 0 | 0 | 20 | 5 | 25 |
| Secale cereale | 0 | 0 | 0 | 0 | 0 | 0 | 30 | 5 | 30 |
| Galium aparine | 35 | 50 | 70 | 40 | 100 | 10 | 55 | 20 | 45 |
| Alopecurus myosuroides | 5 | 10 | 15 | 25 | 35 | 50 | 90 | 55 | 100 |

| kg/ha | IV 2.5 | 4 | V 3 | 4 | I+II 2+1 | I+III 1.5+1.5 |
|---|---|---|---|---|---|---|
| Triticum aestivum | 0 | 30 | 0 | 10 | 0 | 5 |
| Secale cereale | 5 | 30 | 5 | 10 | 0 | 5 |
| Galium aparine | 30 | 50 | 45 | 60 | 90 | 95 |
| Alopecurus myosuroides | 65 | 100 | 75 | 90 | 85 | 90 |

| kg/ha | I+IV 1.5+1.5 | I+V 1+3 |
|---|---|---|
| Triticum aestivum | 0 | 0 |
| Secale cereale | 5 | 5 |
| Galium aparine | 100 | 95 |
| Alopecurus myosuroides | 100 | 95 |

0 = no damage
100 = complete destruction.

EXAMPLE 5

In a greenhouse, the plants Triticum aestivum, Secale cereale, Galium aparine and Alopecurus myosuroides were treated shortly before or during emergence with the following amounts of the following individual active ingredients and compositions thereof in the form of granules:

I 3-isopropyl-2,1,3-benzothiadiazinone-(4)-2,2-dioxide, 1, 1.5, 2, 3 and 4 kg/ha;
II N-(4-chlorophenyl)-N'-methyl-N'-butyn-1-yl-3-urea, 1 and 3 kg/ha;

EXAMPLE 6

In a greenhouse the plants Zea mays, Poa annua, Echinochloa crus-galli, Cyperus esculentus and Galium aparine were treated at a growth height of 2 to 25 cm with the following amounts of the following individual active ingredients and compositions thereof, each being dispersed or emulsified in 500 liters of water per hectare:

I dimethylamine salt of 3-isopropyl-2,1,3-benzothiadiazinone-(4)-2,2-dioxide, 0.5, 2 and 3 kg/ha;

II 3-sec-butyl-2,1,3-benzothiadiazinone-(4)-2,2-dioxide, 1, 1.5 and 2 kg/ha;

III N-3,4-dichlorophenyl-N'-methoxy-N'-methylurea; 0.5 and 1.5 kg/ha;

IV N-3-trifluoromethylphenyl-N',N'-dimethylurea; 1 and 2 kg/ha;

V N-3,4-dichlorophenyl-N-cyclohex-1-enyl-N',N'-dimethylurea, 1 and 3 kg/ha;

VI N-4-bromophenyl-N'-methyl-N'-methoxyurea, 1.5 and 2 kg/ha;

I + V 2 + 1 kg/ha;

I + VI 0.5 + 1.5 kg/ha;

II + III 1 + 0.5 kg/ha;

II + IV 1 + 1 kg/ha.

After 2 to 3 weeks it was ascertained that the compositions had a better herbicidal action than the individual active ingredients, combined with superior crop plant compatibility.

The results of this experiment are given in the following table:

| kg/ha | I 0.5 | 2 | 3 | II 1 | 1.5 | 2 | III 0.5 | 1.5 | IV 1 | 2 |
|---|---|---|---|---|---|---|---|---|---|---|
| Zea mays | 0 | 0 | 0 | 0 | 0 | 5 | 0 | 20 | 0 | 10 |
| Poa annua | 5 | 20 | 30 | 10 | 15 | 20 | 60 | 95 | 70 | 95 |
| Echinochloa crus-galli | 5 | 15 | 25 | 10 | 15 | 25 | 55 | 85 | 60 | 90 |
| Cyperus esculentus | 30 | 85 | 90 | 45 | 70 | 95 | 20 | 55 | 25 | 45 |
| Galium aparine | 30 | 75 | 100 | 60 | 70 | 80 | 25 | 65 | 20 | 40 |

| kg/ha | V 1 | 3 | VI 1.5 | 2 | I + V 2 + 1 | I ° VI 0.5+1.5 +0.5 | II+III | II+IV 1+1 |
|---|---|---|---|---|---|---|---|---|
| Zea mays | 0 | 15 | 0 | 10 | 0 | 0 | 0 | 0 |
| Poa annua | 60 | 100 | 65 | 85 | 95 | 90 | 90 | 90 |
| Echinochloa crus-galli | 70 | 100 | 80 | 95 | 95 | 100 | 85 | 85 |
| Cyperus esculentus | 15 | 45 | 40 | 55 | 100 | 85 | 85 | 85 |
| Galium aparine | 10 | 40 | 30 | 45 | 100 | 90 | 100 | 95 |

I claim:

1. A herbicide composition comprising a herbicidally effective amount of a mixture of
   a. a member selected from the group consisting of 3-isopropyl-2,1,3-benzothiadiazinone-(4)-2,2-dioxide, the sodium salt thereof and the dimethylamine salt thereof; and
   b. a member selected from the group consisting of N-3-chloro-4-methoxyphenyl-N'-methyl-N'-methoxyurea, N-3-chloro-4-methylphenyl-N',N'-dimethylurea, N-(2-benzothiazolyl)-N-methyl-N'-methylurea, N4-chlorophenyl-N-methyl-N'-butyn-1-yl-3-urea, and N-3-chloro-4-methoxyphenyl-N',N'-dimethylurea in a weight ratio of (a) to (b) in the range of 3:1 to 1:3.

* * * * *

UNITED STATES PATENT AND TRADEMARK OFFICE
CERTIFICATE OF CORRECTION

PATENT NO. : 3,912,489
DATED : October 14, 1975
INVENTOR(S) : FISCHER

It is certified that error appears in the above-identified patent and that said Letters Patent are hereby corrected as shown below:

Column 5, the heading of the table, add --II-- above "1" (second occurence)

Column 7, the heading on the top of the 2nd table, delete "1°VI" and substitute --1+VI--

Column 7, the heading on the top of the 2nd table, delete "+0.5" and substitute --1+0.5--

Signed and Sealed this

Fourteenth Day of September 1976

[SEAL]

Attest:

RUTH C. MASON
Attesting Officer

C. MARSHALL DANN
Commissioner of Patents and Trademarks